US007049807B2

(12) United States Patent
Okuma et al.

(10) Patent No.: US 7,049,807 B2
(45) Date of Patent: May 23, 2006

(54) ROTATION DETECTION DEVICE WITH MAGNET MAGNETIZED AFTER INTERGRATION WITH GEAR (75) Inventors: Sakae Okuma, Tokyo (JP); Shinya Inabe, Tokyo (JP); Tetsuya Inotsuka, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 10/445,013

(22) Filed: May 27, 2003

(65) Prior Publication Data
US 2003/0222643 A1 Dec. 4, 2003

(30) Foreign Application Priority Data
May 28, 2002 (JP) ............... P2002-153759

(51) Int. Cl.
*G01B 7/30* (2006.01)
*G01B 7/14* (2006.01)
(52) U.S. Cl. ............... 324/207.25; 324/207.22
(58) Field of Classification Search ........... 324/207.25, 324/207.22
See application file for complete search history.

(56) References Cited
U.S. PATENT DOCUMENTS
4,820,978 A * 4/1989 Hirota .................. 324/166
5,044,613 A 9/1991 Kumar et al.
5,634,182 A * 5/1997 Asanae et al. ............ 399/267
5,734,266 A * 3/1998 Spies .................. 324/207.22
6,163,125 A * 12/2000 Bernauer et al. ........... 318/626

FOREIGN PATENT DOCUMENTS
| DE | 44 00 874 A1 | 9/1994 |
| EP | 1 003 268 A1 | 5/2000 |
| JP | 2000-283705 | 10/2000 |
| JP | 2000-283705 A1 | 10/2000 |
| WO | WO 00 34746 A1 | 6/2000 |

OTHER PUBLICATIONS
European Search Report Sep. 8, 2003.

* cited by examiner

*Primary Examiner*—Edward Lefkowitz
*Assistant Examiner*—David M Schindler
(74) *Attorney, Agent, or Firm*—Rader, Fishman & Grauer PLLC (57) ABSTRACT A rotation detecting apparatus including a drive gear rotatably supported by a case and capable of rotating cooperatively with an object to be detected, driven gears and rotatably supported by the case and brought in mesh with the drive gear, magnets provided at rotational center portions of the driven gears and having plane portions formed with N poles and S poles, a circuit board arranged at the case and capable of being connected to outside, magnetic reluctance elements attached to the circuit board and opposed to the plane portions of the magnets and an electronic circuit part for convertion output signals of the magnetic reluctance element into rotational angle signals, wherein the magnets of the driven gears are formed with the N poles and the S poles by magnetizing the magnets after having been subjected to insert molding by a resin.

4 Claims, 5 Drawing Sheets

PRIOR ART

(a)

PRIOR ART

(b)

ROTATION DETECTION DEVICE WITH MAGNET MAGNETIZED AFTER INTERGRATION WITH GEAR

BACKGROUND OF THE INVENTION

1. Field of the Invention

The present invention relates to a rotation detecting apparatus provided for detecting a rotational angle of a steering wheel of an automobile or the like and a method of fabricating the same.

2. Description of Related Art

Figure 8:
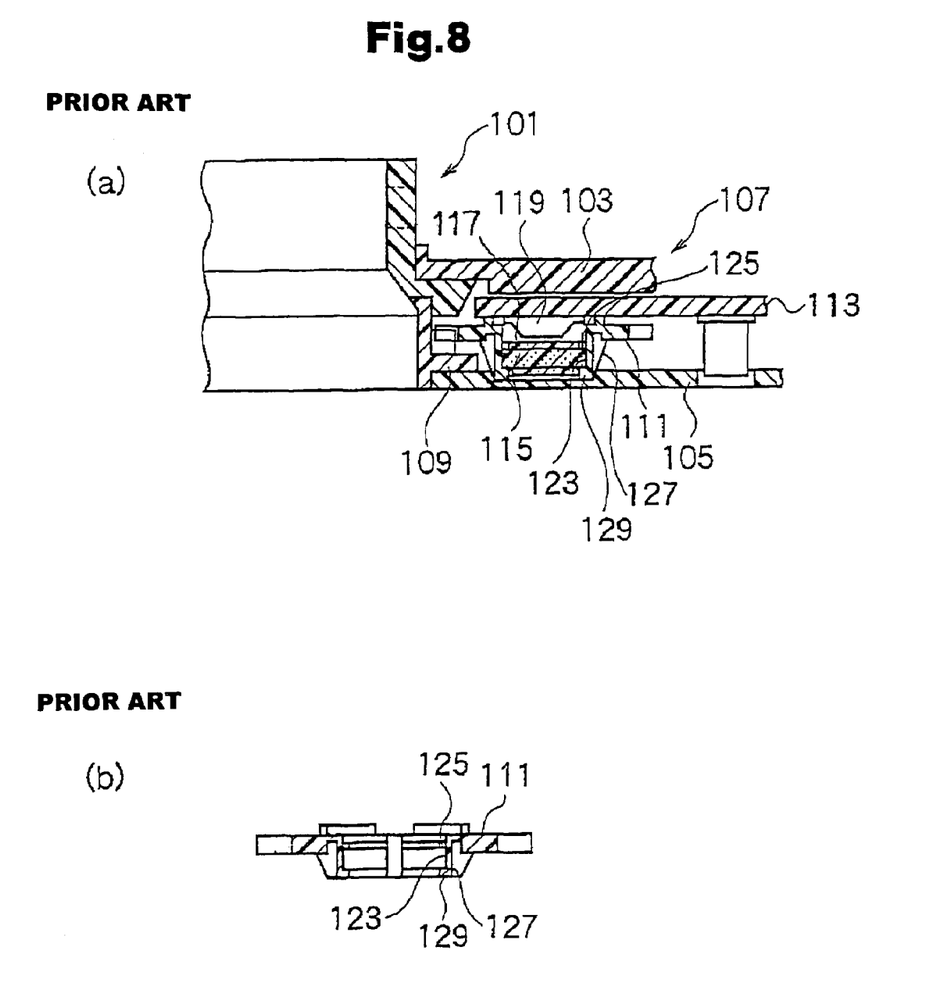
FIG. 8A is a sectional view of an essential portion and FIG. 8B is a sectional view of a driven gear detached of a magnet according to a conventional example.

There is a conventional rotation detecting apparatus described in, for example, JP-A-2000-283705 as shown by FIG. 8. FIG. 8A is a sectional view of an essential portion thereof and FIG. 8B is a sectional view of a driven gear detached of a magnet. FIG. 8A shows a rotation detecting apparatus integrated to a rotational connector apparatus 101 for electrically connecting a vehicle body side thereof and a steering wheel side thereof.

A rotation detecting apparatus 107 is provided between a lower housing member 103 and a lower cover member 105 of the rotational connector apparatus 101. The rotation detecting apparatus 107 is generally constituted by a drive gear 109, a driven gear 111, and a circuit board 113.

The drive gear 109 is constructed by a constitution of being cooperatively rotated in accordance with rotation of the steering wheel. The driven gear 111 is brought in mesh with the drive gear 109. The driven gear 111 is provided with a magnet 115 at a rotational center portion thereof. The magnet 115 includes a plane portion 117. The plane portion 117 is contiguously formed with an N pole and an S pole with a rotational center of the driven gear 111 as a boundary. The driven gear 111 is constructed by a constitution in which one face side thereof is rotatably supported by the cover member 105 and other face side thereof is brought into sliding contact with the circuit board 113. The circuit board 113 is provided with a magnetic reluctance element 119 opposed to the plane portion 117 of the magnet 115.

A portion of the driven gear 111 for attaching the magnet 115 is as shown by FIG. 8B. The driven gear 111 is provided with a holding hole 123 for holding the magnet 115. An inner peripheral wall of the holding hole 123 is provided with a stepped portion 125 and a plurality of press claw members 127 are provided along the inner peripheral wall in a peripheral direction at predetermined intervals. A front end of the press claw member 127 is provided with a press claw 129.

The magnet 115 is contained at inside of the holding hole 123 while opening the press claw members 127 and the stepped portion 125 and the press claws 129 are engaged with the magnet 115 by closing the press claw members 127 to thereby attach the magnet 115.

Further, when the drive gear 109 is rotated in accordance with steering of the steering wheel, the driven gear 111 is rotated cooperatively therewith. When the magnet 115 is rotated by rotating the driven gear 111, a magnetic field of the magnetic reluctance element 119 opposed to the plane portion 117 formed with the N pole and the S pole is changed and a reluctance value of the magnetic reluctance element 119 is changed in accordance with the change. An angle signal can be outputted to an external system by converting the change into the angle signal by an electronic circuit portion.

Therefore, a steering angle of the steering wheel or the like can accurately be detected without restricting an angle detecting range.

Meanwhile, a direction of integrating the magnet 115 is restricted to make the plane portion 117 contiguously formed with the N pole and the S pole opposed to the magnetic reluctance element 119. Therefore, when the magnet 115 is formed by injection molding, the plane portion 117 needs to firmly be opposed to the magnetic reluctance element 119 by determining the plane portion 117 formed with the N pole and the S pole based on identification of a so-to-speak gate mark or the like and the integration becomes significantly troublesome.

Further, there is a concern of deteriorating detection accuracy by introducing an error in detecting rotation by shifting a rotational center of the driven gear 111 from a rotational center of the magnet 115 by play between the holding hole 123 and the magnet 115.

Further, in integrating the magnet 115, a drawback of chipping the magnet 115 is liable to bring about since the temporarily opened press claw member 127 is strongly brought back to impinge on the magnet 115.

SUMMARY OF THE INVENTION

It is an object of the invention to provide a rotation detecting apparatus facilitating integration, restraining occurrence of play and enabling to restrain destruction of a magnet in integrating and a method of fabricating the same.

A first aspect of the invention is characterized in that in a rotation detecting apparatus comprising a drive gear rotatably supported by a case and capable of rotating cooperatively with an object to be detected, a driven gear rotatably supported by the case and brought in mesh with the drive gear, a magnet provided at a rotational center portion of the driven gear and formed contiguously with an N pole and an S pole, and a magnetic reluctance element opposed to a face portion of the magnet and an electronic circuit part for converting an output signal of the magnetic reluctance element into a rotational angle signal wherein the magnet is formed with the N pole and the S pole by magnetizing the magnet after having been integrated to the driven gear.

A second aspect of the invention is characterized in that in a method of fabricating a rotation detecting apparatus including a driven gear provided with a magnet for detecting rotation at a rotational center portion thereof, the method comprising a first step of providing a magnetic body before being magnetized having a face portion for forming poles at the rotational center portion of the driven gear, and a second step of positioning the driven gear fixed with the magnetic body and forming an N pole and an S pole contiguously at the face portion by magnetizing the magnetic body with the rotational center of the driven gear as a reference.

A third aspect of the invention is a method of fabricating a rotation detecting apparatus according to the second aspect of the invention, wherein in the first step, the magnetic body before being magnetized is formed by injection molding of a plastic base and the magnetic body is provided at the rotational center portion of the driven gear by subjecting a resin to insert molding.

A fourth aspect of the invention is a method of fabricating a rotation detecting apparatus according to the second and third aspects of the invention, wherein in the first step, two end faces of the magnetic body in a rotational center axis direction of the driven gear is formed to be flat and the two end faces of the magnetic body are projected from respective faces in a rotational center axis direction of the driven gear or set to be flush therewith.

According to the first aspect of the invention, when the drive gear rotatably supported by the case is rotated cooperatively with an object to be detected, the driven gear brought in mesh with the drive gear is rotated cooperatively therewith. The driven gear is provided with the magnet having the face portion contiguously formed with the N pole and the S pole at the rotational center portion and the magnet can be rotated along with the driven gear. By rotating the magnet, a magnetic field of the magnetic reluctance element opposed to the face portion of the magnet is changed, a reluctance value of the magnetic reluctance element is changed in accordance with the change and a signal can be outputted. The output signal of the magnetic reluctance element can be converted into the rotational angle signal by the electronic circuit part to output to an external system as an angle signal.

Further, since the magnet is formed with the N pole and the S pole by magnetizing the magnet after having been integrated to the driven gear and therefore, it is not necessary to take a direction of integrating the magnet formed contiguously with the N pole and the S pole at the face portion into consideration and the integration can significantly be facilitated.

According to the second aspect of the invention, in the method of fabricating the rotation detecting apparatus including the driven gear provided with the magnet for detecting rotation at the rotational center portion, the magnetic body before being magnetized having the face portion for forming the poles can be provided at the rotational center portion of the driven gear by the first step. The driven gear provided with the magnetic body can be positioned by the second step and the magnetic body can be formed contiguously with the N and the S poles at the face portion by magnetizing the magnetic body with the rotational center of the driven gear as the reference.

Therefore, the N and S poles of the magnet of the driven gear can accurately be provided in the state of being contiguous to the face portion with the rotational center of the driven gear as the reference.

According to the third aspect of the invention, in addition to an effect of the second aspect of the invention, in the first step, the magnetic body before being magnetized can be formed by injection molding of the plastic base and the magnetic body can be provided at the rotational center portion of the driven gear by subjecting the resin to insert molding.

Therefore, it is not necessary to take a direction of integrating the magnet formed contiguously with the N pole and the S pole at the face portion into consideration and the integration can significantly be facilitated.

Further, the driven gear and the magnet are integrated by subjecting the resin to insert molding, play therebetween is difficult to be brought about, coincidence of the rotational center of the driven gear and the rotational center of the magnet can accurately be maintained and rotation can accurately be detected.

Further, since the magnet is provided at the driven gear by subjecting the resin to insert molding, a press claw member or the like for locking is not strongly brought into contact therewith in integrating operation and destruction of the magnet can be restrained.

According to the fourth aspect of the invention, in addition to an effect of the second and third aspects of the invention, in the first step, the two end faces of the magnet body are formed to be flat in the rotational center axis direction of the driven gear, the two end faces of the magnetic body are projected from the respective faces in the rotational center axis direction of the driven gear or set in flush therewith and therefore, the end face of the magnetic body is facilitated to be brought into close contact with the magnetic pole for magnetizing and the magnetizing efficiency can be promoted.

DESCRIPTION OF PREFERRED EMBODIMENTS (First Embodiment)

Figure 1:
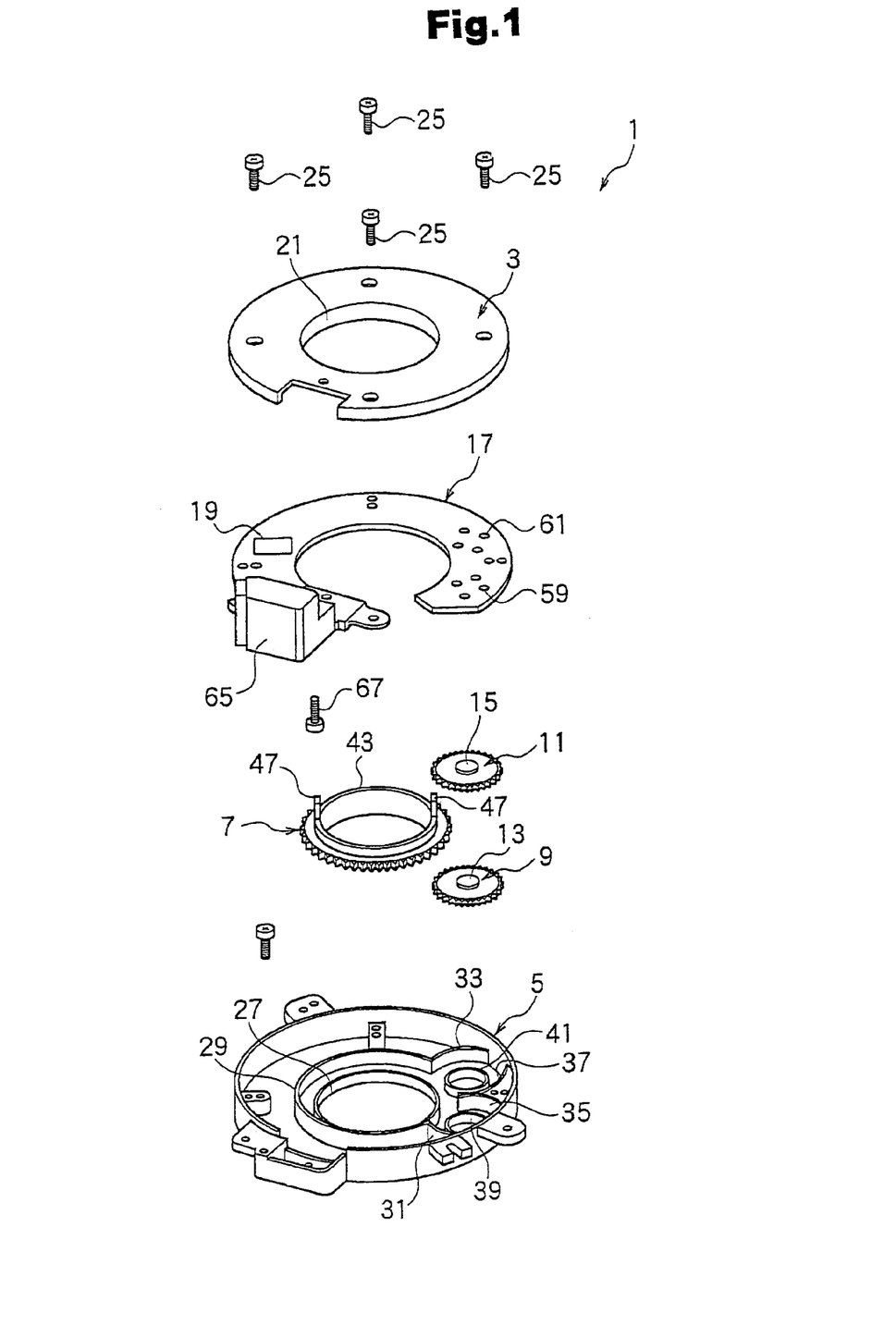
FIG. 1 is a disassembled perspective view of a rotation detecting apparatus according to a first embodiment of the invention.
Figure 2:
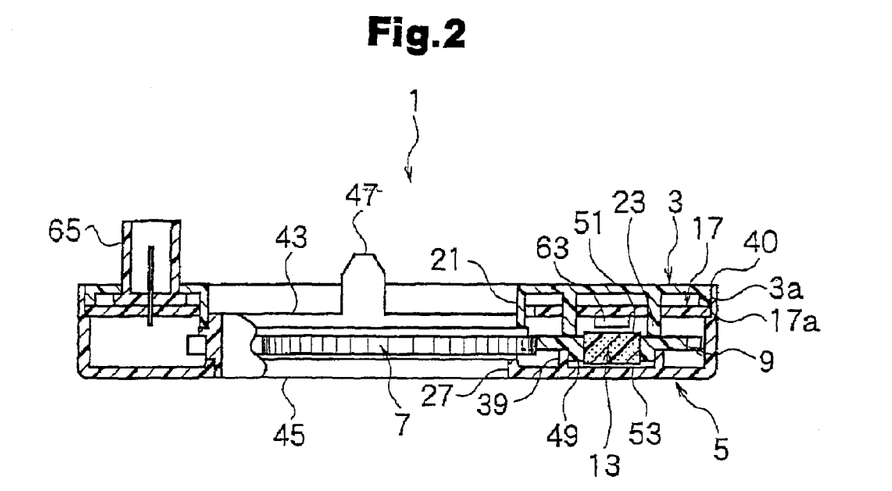
FIG. 2 is a sectional view of the rotation detecting apparatus according to the first embodiment.

FIG. 1 is a disassembled perspective view of a rotation detecting apparatus according to a first embodiment of the invention and FIG. 2 shows a sectional view of the rotation detecting apparatus. As shown by FIG. 1 and FIG. 2, according to a rotation detecting apparatus 1, a drive gear 7 is rotatably supported by a case 5 having a cover 3. A pair of driven gears 9 and 11 are rotatably supported between the cover 3 and the case 5. The respective driven gears 9 and 11 are brought in mesh with the drive gear 7. Magnets 13 and 15 are provided at rotational center portions of the driven gears 9 and 11.

The cover 3, the case 5, the drive gear 7, and the driven gears 9 and 11 are formed by resin materials having substantially the same linear expansion coefficient.

A number of teeth m of the drive gear 7 and a number of teeth n of the driven gear 9 or 11 are set to dividable values such that a value of n/m becomes a finite terminating decimal. Therefore, an error by rounding a numerical value is not brought about, operation at an electronic circuit part 19 can be simplified and accuracy thereof can be promoted.

The case 5 is arranged with a circuit board 17 connectable to outside. The circuit board 17 is attached with a magnetic reluctance element 63 and the electronic circuit part 19 for converting an output signal of the magnetic reluctance element 63 into a rotational angle signal.

Figure 3:
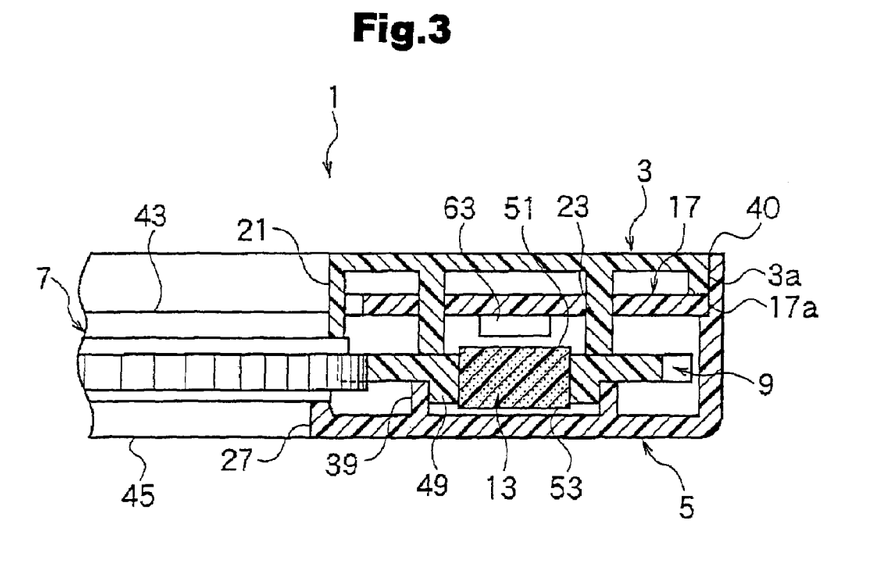
FIG. 3 is a sectional view enlarging an essential portion according to the first embodiment.
Figure 4:
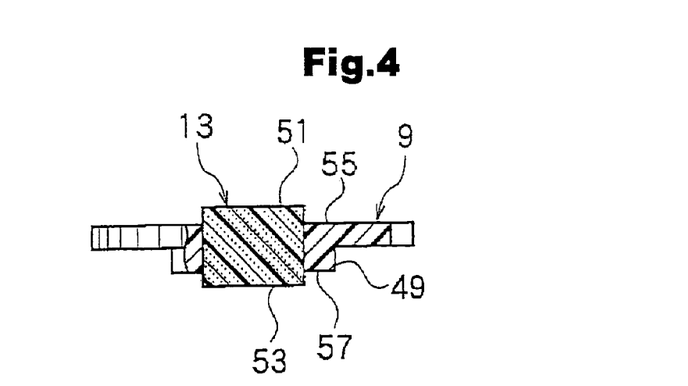
FIG. 4 is a front view constituting a section by a portion of a driven gear according to the first embodiment.
Figure 5:
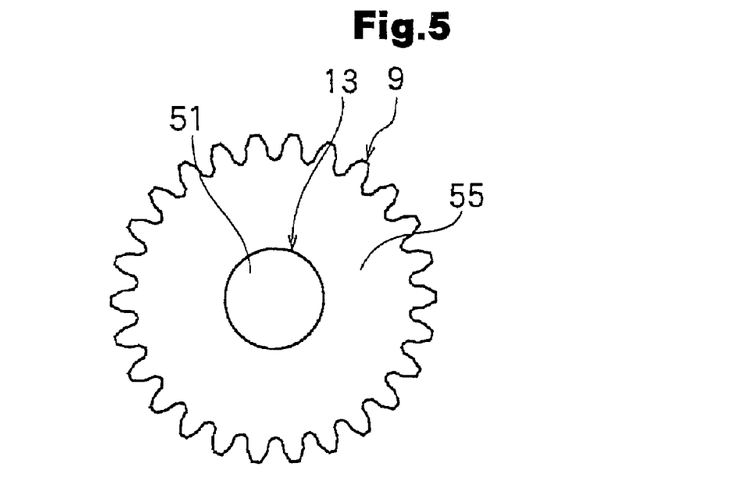
FIG. 5 is a plane view of the driven gear according to the first embodiment.
Figure 6:
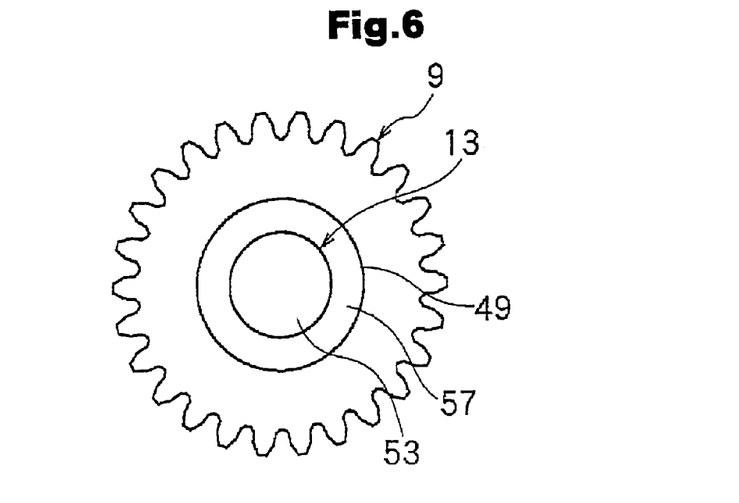
FIG. 6 is a bottom view of the driven gear according to the first embodiment.

A further explanation will be given here of details of respective portions also in reference to FIG. 3 through FIG. 6. FIG. 3 is a sectional view enlarging an essential portion of the rotation detecting apparatus 1, FIG. 4 is a front view constituting a section by a portion of the driven gear, FIG. 5 is a plane view of the driven gear, and FIG. 6 is a bottom view of the driven gear.

First, as shown by FIG. 1, FIG. 2 and FIG. 3, the cover 3 is provided with a support hole 21 for rotatably supporting to fit a side of the drive gear 7 at a central portion thereof. The cover 3 is provided with projected portions 23 respectively in correspondence with the respective driven gears 9 and 11. For example, four pieces of the projected portions 23 are provided for each of the respective driven gear 9 and 11 and uniformly arranged in peripheral directions centering on rotational centers of the respective driven gears 9 and 11. The cover 3 is fixedly fastened to the case 5 along with the circuit board 17 by, for example, four pieces of tapping screws 25.

The case 5 is provided with a support hole 27 for rotatably supporting the drive gear 7 at a central portion. At a surrounding of the support hole 27, there is provided a peripheral wall portion 29 for surrounding an outer periphery of the drive gear 7 with a clearance therebetween. The peripheral wall portion 29 is continuous with wall portions 31 and 33 extended to sides of the driven gears 9 and 11. Wall portions 35 and 37 are provided at a middle portion at which the wall portions 31 and 33 are opposed to each other. There is constructed a constitution in which the outer periphery of the driven gear 9 is surrounded by the wall portions 31 and 35 and the outer periphery of the driven gear 11 is surrounded by the wall portions 33 and 37 with clearances therebetween. Driven gear supporting portions 39 and 41 are projected in a cylindrical shape at a central portion between the wall portions 31 and 35 and a central portion between the wall portions 33 and 37. The case 5 is provided with a fitting recess portion 40 at an inner peripheral face thereof on a side of the cover 3.

The drive gear 7 is projected with fitting boss portions 43 and 45 at two side faces thereof. The fitting boss portion 43 on one side is projected with a pair of engaging claws 47. The engaging claw 47 is constructed by a constitution of engaging with a side of the steering wheel which is an object to be detected and rotating the drive gear 7 cooperatively with rotation on the side of the steering wheel.

The driven gears 9 and 11 will be explained also in reference to FIG. 4 through FIG. 6. The explanation will be given of the driven gear 9 since the driven gears 9 and 11 are constituted by the same structure. The driven gear 9 includes a fitting boss portion 49. The magnet 13 is concentrically provided at the rotational center portion of the driven gear 9. The magnet 13 is formed in a cylindrical shape and is subjected to insert molding with the driven gear 9.

The magnet 13 includes plane portions 51 and 53 as face portions thereof. The plane portions 51 and 53 are formed to project from faces 55 and 57 of the driven gear 13. However, the plane portions 51 and 53 can also be formed to be flush with the faces 55 and 57.

The plane portion 51 is formed with an N pole and an S pole contiguously with the rotational center as a boundary. The plane portion 51 is magnetized with N-S with the rotational center of the driven gear 9 as a reference after subjecting a magnetic body, in a cylindrical shape formed by the injection molding, to insert molding with the driven gear 9 before being magnetized.

The circuit board 17 is provided with pluralities of through holes 59 and 61 at positions respectively in correspondence with the driven gear supporting portions 39 and 41. The through holes 59 and 61 penetrate the respective projected portions 23 of the cover 3. The circuit board 17 is respectively provided with the magnetic reluctance elements 63 opposed to the plane portions 51 of the magnets 13 and 15 above the driven gear supporting portions 39 and 41. The circuit board 17 is provided with a connector 65. The connector 65 is made connectable to outside and is fixed to the circuit board 17 by, for example, a tapping screw 67. However, the connector 65 can also be connected to the side of the case 5 by a tapping screw.

The electronic circuit part 19, the magnetic reluctance element 63 and the connector 65 constitute a circuit above the circuit board 17.

Further, the fitting boss portion 45 of the drive gear 7 is fittedly supported by the drive gear supporting hole 27 of the case 5. The driven gears 9 and 11 are respectively supported by the driven gear supporting portions 39 and 41. The support is carried out by fitting the fitting boss portions 49 of the driven gears 9 and 11 to the driven gear supporting portions 39 and 41.

The circuit board 17 is fitted to the case 5 and an outer peripheral portion 17a thereof is fittedly supported by the fitting recess portion 41 of the case 5. The cover 3 is fitted to the case 5 and an outer peripheral portion 3a of the cover 3 is fittedly supported by the fitting recess portion 40 of the cover 3. The respective projected portions 23 of the cover 3 respectively penetrate the through holes 59 and 61 and front ends thereof are respectively opposed to the driven gears 9 and 11.

The case 5 and the cover 3 are fixedly fastened by the tapping screws 25. Thereby, a constitution is constructed in which the driven gears 9 and 11 are rotatably interposed by the driven gear supporting portions 39 and 41 and the projected portions 23 and the driven gears 9 and 11 are rotatably interposed by the case 5 and the cover 3. That is, the driven gears 9 and 11 are rotatable around rotational centers thereof in the interposed state.

In a state in which the driven gears 9 and 11 are supported as described above, a constant distance is maintained between the plane portions 51 of the magnets 13 and 15 and the magnetic reluctance elements 63.

Figure 7:
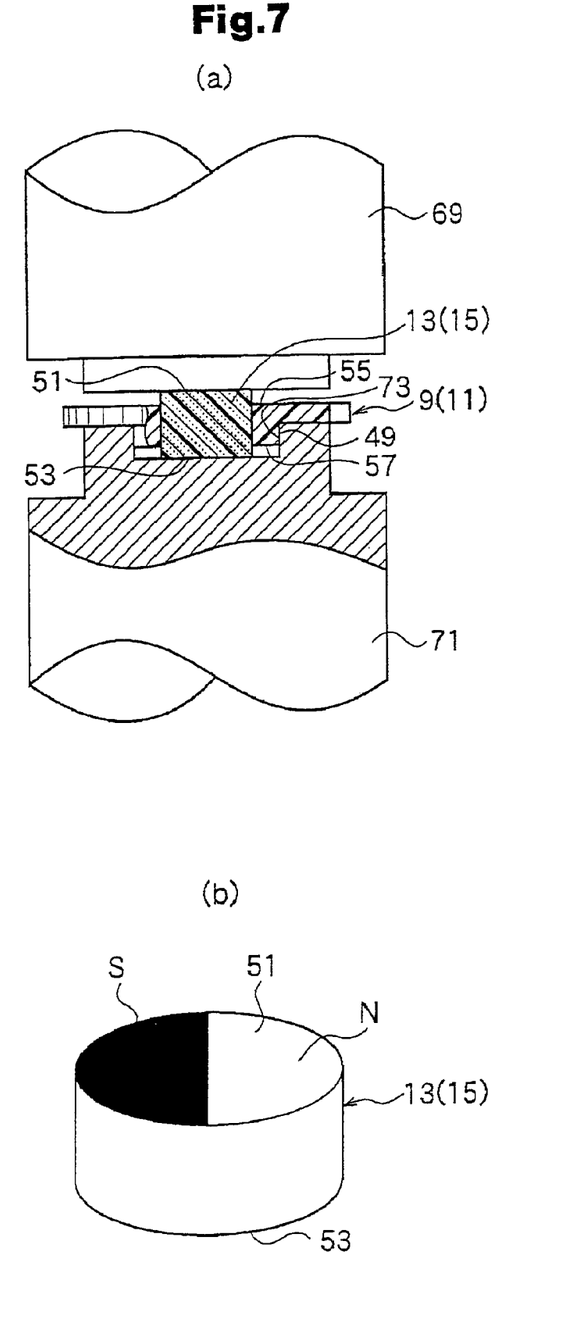
FIG. 7A is an explanatory view showing a magnetizing step and FIG. 7B is a perspective view of a magnet after having been magnetized according to the first embodiment.

FIG. 7A shows a step of magnetizing the magnet 13 of the driven gear 9 by a magnetizing apparatus and FIG. 7B shows the magnet 13 after having been magnetized. Further, the magnetizing step is similar to that of the magnet 15 of the driven gear 11, the magnet 13 of the driven gear 9 will mainly be explained and correspondence of the magnet 15 of the driven gear 11 will be shown by attaching a bracket.

The magnetizing apparatus of FIG. 7A is provided with a magnetic pole 69 for magnetizing and a jig 71. The jig 71 is formed with a recess portion 73.

The driven gear 9 having the magnet 13 is fabricated by a first step and a second step shown below.

(First step) First, a magnetic body in a cylindrical shape before being magnetized constituting a base member of the magnet 13 (magnet 13 before being magnetized) is formed by injection molding of plastic base.

Injection molding of the plastic base signifies that a resin of nylon, PPS or the like is mixed with a magnetic powder and the magnetic body before being magnetized is formed in a cylindrical shape by injection molding. A blend ratio of the resin and the magnetic powder can variously be selected. As the magnetic powder, for example, a neodymium alloy, a samarium-cobalt alloy or the like is used.

According to the magnetic body for constituting the base member of the magnet 13, two end faces thereof in a rotational center axis direction are formed to be flat and are provided with the plane portion 51 for forming poles and the plane portion 53 for bringing the jig into contact therewith.

The magnetic body for constituting the base member of the magnet 13 is provided at the rotational center portion of the driven gear 9 by insert molding of the resin. The plane portions 51 and 53 for constituting the two end faces of the magnetic body are formed to project from the faces 55 and 57 of the driven gear 9.

(Second step) After the insert molding, the plane portion 51 of the magnetic body constituting the base member of the magnet 13 is magnetized between the magnetic pole 69 and the jig 71. In this case, the fitting boss portion 49 of the driven gear 9 is fittedly supported by the recess portion 73 of the jig 71. By the support, centers of the magnetic pole 69 and the jig 71 and the rotational center of the driven gear 9 are axially aligned to position the driven gear 9 fixed with the magnetic body.

In the positioned state, N-S poles are magnetized at the plane portion 51 of the magnetic body with the rotational center of the driven gear 9 as a reference. Thereby, as shown by FIG. 7B, an N pole and an S pole are accurately formed at the plane portion 51 of the magnet 13 contiguously with the rotational center as a boundary.

In the magnetizing operation, since the plane portions 51 and 53 which are the two end faces of the magnetic body are projected from the faces 55 and 57 of the driven gear 9, the plane portions 51 and 53 can firmly be brought into close contact with faces of the magnetic pole 69 and the jig 71 and the magnetizing operation by the magnetic pole 69 can efficiently be carried out. That is, the plane portion 51 and the magnetic pole 69 are uniformly brought into close contact with each other without a clearance therebetween, since the magnetizing efficiency is excellent, when the plane portions 51 and 53 of the magnetic body are projected, in the molding operation, only the flatness of the plane portions 51 and 53 may be controlled by disregarding molding accuracy of the driven gear 9 and the control is facilitated. Further, even when the plane portions 51 and 53 are flush with the faces 55 and 57 of the driven gear 9, a similar effect can be achieved when the flatness control is accurately carried out.

In this way, the magnetic body before being magnetized having the plane portion 51 for forming the poles is provided at the rotational center portion of the driven gear 9 by the first step, the driven gear 9 fixed with the magnetic body is positioned by the second step, the N and the S poles are contiguously formed at the plane portion 51 by magnetizing the magnetic body with the rotational center of the driven gear 9 as the reference and therefore, the N and the S poles of the magnet 13 or 15 of the driven gear 9 or 11 can accurately be provided in the contiguous state at the plane portion 51 with the rotational center of the driven gear 9 or 11 as the reference.

In the first step, the magnetic body before being magnetized is formed by injection molding of the plastic base, the magnetic body is provided at the rotational center portion of the driven gear 9 or 11 by insert molding of the resin and therefore, it is not necessary to take a direction of integrating the magnet 13 or 15 formed contiguously with the N pole and the S pole at the plane portion 51 into consideration and the integrating operation can significantly be facilitated.

Further, the driven gear 9 or 11 and the magnet 13 or 15 are integrated by insert molding by the resin, play therebetween is difficult to occur, coincidence of the rotational center of the driven gear 9 or 11 and the rotational center of the magnet 13 or 15 can accurately be maintained and rotation can accurately be detected.

Further, the magnet 13 or 15 is provided at the driven gear 9 or 11 by insert molding by the resin and therefore, a press claw member or the like for locking is not strongly brought into contact therewith in the integrating operation and destruction of the magnet 13 or 15 can be restrained.

According to the first step, the two end faces of the magnetic body are formed to be flat in a rotational center axis direction of the driven gear 9 or 11, the two end faces of the magnetic body are projected from the respective faces of the driven gear 9 or 11 in the rotational center axis direction and therefore, it is easy to bring the end face of the magnetic body into close contact with the magnetic pole for magnetizing as described above, the magnetizing efficiency is promoted and therefore, the control can be facilitated.

Next, the above-described rotation detecting apparatus is attached to a base of a combination switch or the like, the engaging claw 47 is engaged with the side of the steering wheel and the drive gear 7 can be rotated cooperatively with the side of the steering wheel which is the object to be detected.

When the drive gear 7 is rotated in accordance with steering of the steering wheel, the driven gears 9 and 11 which are brought in mesh with the drive gear 7 are cooperatively rotated. By rotating the driven gears 9 and 11, the magnets 13 and 15 are rotated and the magnetic fields of the magnetic reluctance elements 63 opposed thereto are changed and the reluctance value of the magnetic reluctance element 63 is changed in accordance with the change.

The change of the reluctance value is converted into an angle signal by the electronic circuit part 19 and outputted as the angle signal to an external system via the connector 65. Therefore, a rotational angle of the object to be detected of the steering wheel or the like can accurately be detected.

According to the embodiment, the drive gear 7 is provided with two pieces of the driven gears 9 and 11 having the same teeth number and two of the magnetic reluctance elements 63 in correspondence therewith and therefore, when a difference between respective detection angles is equal to or larger than a prescribed amount by detection by the respective magnets 13 and 15 of the respective driven gears 9 and 11 and the respective magnetic reluctance elements 63, the apparatus can be determined to be failed and a failure signal can be outputted.

The cover 3, the case 5, the drive gear 7 and the driven gears 9 and 11 are formed by resin materials having substantially the same linear expansion coefficient and therefore, even when temperature is changed as in high temperature or low temperature, influence is restrained from effecting on a relative relationship among the case 5, the cover 3, the drive gear 7 and the driven gears 9 and 11 and detection accuracy equivalent to that in normal temperature can be ensured.

Further, although according to the embodiment, the rotational angle of the steering wheel as the object to be detected is detected, a constitution of detecting a rotational angle of other rotating body can also be constructed.

Although the magnetic body in the cylindrical shape before being magnetized for forming the magnet 13 or 15 is provided at the driven gear 9 or 11 by insert molding, a constitution can also be constructed in which the magnetic body before being magnetized is fixed to the driven gear 9 or 11 by adherence or the like and the magnetic body is magnetized with the rotational center of the driven gear 9 or 11 as the reference thereafter.

There can also be constituted a constitution in which the magnet 13 or 15 is provided to expose to only the face of the driven gear 13 or 15 on the side of the magnetic reluctance element 63 without being formed to penetrate the driven gear 9 or 11.

The magnet 13 or 15 is for generating a uniform magnetic field in a constant direction at the magnetic reluctance element 63 by rotation and is not limited to the cylindrical shape but may be formed in a rectangular parallelepiped or the like so far as the similar function is achieved.

Other than injection molding of plastic base, the magnet 13 or 15 which is sintered can also be subjected to insert molding or the like with the driven gear 9 or 11.

The case 5, the cover 3, the drive gear 7 and the driven gear 9 can also be formed by resin materials having different linear expansion coefficients and can also be formed by a material other than the resin.

The teeth number m of the drive gear 7 and the teeth number n of the driven gear 9 or 11 can arbitrarily be selected other than the above-described.

Although according to the embodiment, the circuit board 17 is provided, a constitution of directly attaching the magnetic reluctance element 63 to the cover 3 can be constructed by omitting the circuit board 17.

What is claimed is:

1. A rotation detecting apparatus comprising:
   a drive gear rotatably supported by a case and capable of rotating cooperatively with an object to be detected;
   a driven gear rotatably supported by the case and brought in mesh with the drive gear;
   a magnet provided at a rotational center portion of the driven gear and formed contiguously with an N pole and an S pole; and
   a magnetic reluctance element opposed to a face portion of the magnet and an electronic circuit part for converting an output signal of the magnetic reluctance element into a rotational angle signal:
   wherein the magnet is formed with the N pole and the S pole by magnetizing the magnet after having been integrated with the driven gear, wherein the magnet is formed with the N pole and the S pole contiguously at the face portion by magnetizing a magnetic body, and
   wherein two end faces of the magnetic body in a rotational center axis direction of the driven gear are formed to be flat and the two end faces of the magnetic body are projected from respective faces of the driven gear in a rotational center axis direction of the driven gear or set to be flush therewith.

2. A rotation detecting apparatus comprising:
   a drive gear rotatably supported by a case and capable of rotating cooperatively with an object to be detected;
   a driven gear rotatably supported by the case and brought in mesh with the drive gear;
   a magnet provided at a rotational center portion of the driven gear and formed contiguously with an N pole and an S pole; and
   a magnetic reluctance element opposed to a face portion of the magnet and an electronic circuit part for converting an output signal of the magnetic reluctance element into a rotational angle signal:
   wherein the magnet is formed with the N pole and the S pole by magnetizing the magnet after having been integrated with the driven gear, wherein the magnet is formed with the N pole and the S pole contiguously at the face portion, by magnetizing a magnetic body, and
   wherein the magnetic body before being magnetized is formed by injection molding of a plastic base and the magnetic body is provided at the rotational center portion of the driven gear by subjecting a resin to insert molding.

3. The rotation detecting apparatus according to claim 2, wherein two end faces of the magnetic body in a rotational center axis direction of the driven gear are formed to be flat and the two end faces of the magnetic body are projected from respective faces of the driven gear in a rotational center axis direction of the driven gear or set to be flush therewith.

4. A method of making and/or using the rotation detecting apparatus as set forth in any one of claims 1, 2 and 3.

* * * * *